United States Patent Office 3,666,484
Patented May 30, 1972

3,666,484
PROCESS FOR MAKING A SPRAY-DRIED INSTANT TEA OF DESIRED BULK DENSITY
Martin Gurkin, Bardonia, N.Y., and Gary Warner Sanderson and Harold Nathaniel Graham, Englewood, N.J., assignors to Thomas J. Lipton, Inc., Englewood Cliffs, N.J.
No Drawing. Filed Nov. 12, 1969, Ser. No. 876,043
Int. Cl. A23f 3/00
U.S. Cl. 99—77
3 Claims

ABSTRACT OF THE DISCLOSURE

A process for making a spray-dried instant tea powder without adding foreign filler materials to the instant tea in which the tea extract is prepared from tea leaves by hot water extraction methods, controlled amounts of pectic substances derived from tea leaf are added to the extract and the mixture is spray-dried to form an instant tea powder having the desired bulk density.

---

This invention relates to a process for controlling the bulk density of spray-dried instant tea and to the instant tea product of that process, and more particularly to a process for adding measured amounts of tea pectic substances to tea extracts prior to spray-drying to control the bulk density of the instant tea powder.

It has long been a practice in the instant tea art that additional filler material, such as malto-dextrin, is added to tea extracts prior to drying to provide the desirable bulk or volume to the instant tea powder. Instant tea powders prepared without the addition of foreign filler material have not had sufficient bulk to permit a desirable cup of instant tea beverage to be produced from a level teaspoon of instant tea powder. A level teaspoon of unfilled instant tea powder produced a tea beverage which was too strong. The addition of foreign filler material to the instant tea extract provided the necessary bulk but brought with it attendant problems of greatly increased weight.

The tea industry is desirous of producing pure instant tea powders which have lower bulk densities.

It is therefore an object of this invention to provide a process for controlling the bulk density of instant tea powders. It is also an object to provide an instant tea powder having controlled bulk density without the addition of foreign filler material.

The foregoing objects are achieved according to this invention by first preparing a tea extract by hot water extraction methods, such as disclosed in U.S. Pat. No. 2,902,368 to Seltzer et al. The extract may be decreamed, dehazed and concentrated if desired. Pectic substances derived from tea leaf are added in known controlled amounts to the tea extract. The combined tea extract and tea pectic substances are then spray-dried to form an instant tea powder having a known controlled bulk density without presence of foreign filler materials, such as malto-dextrin or other carbohydrates.

The amount of tea pectic substances added to the tea extract determines the resulting bulk density of the spray-dried instant tea powder. Other influencing conditions include spray tower conditions, e.g., inlet temperature, nozzle pressure, type of gas used and tower height. A preferred range of bulk density for the spray-dried powder of this invention is 0.045 gram per milliliter to 0.10 gram per milliliter.

Although any amount of tea pectic substances may be added to the tea extract, it has been found that the addition of amounts of tea pectic substances in excess of 2% (by weight of tea solids in the tea extract) may cause the instant tea powder to be somewhat less soluble in cold hard water. Conversely, amounts of tea pectic substances less than 0.2% by weight may not provide sufficient bulk density control. Approximately 1% tea pectic substances by weight provides an instant tea product having an acceptable bulk density. It is preferred that the tea pectic substances be added to the tea extract in the form of a 10% to 25% aqueous solution, although other concentrations are effective.

The pectic substances employable in this process may be derived by a variety of methods from any tea leaf sources. Such methods and sources include the extraction of spent tea leaves with alkaline or acidic conditions and separation of the pectic substances from the spent leaf extract by precipitation in aqueous alcoholic solutions. Other methods of preparation include steaming fermented unfired green leaf prior to extraction with hot water, as well as steaming fired black leaf prior to hot water extraction. Both steaming processes increase the concentration of the desired pectic substances in the extract, thus providing improved control of bulk density. The term pectic substances includes pectins and other pectic substances which precipitate in aqueous alcohol.

Pectic substances from tea leaf sources have been found to perform better in controlling bulk density and providing acceptable solubility of the instant tea powder than do pectins from other sources, such as fruits and vegetables. In addition, the final instant tea powder contains only materials derived from tea leaf and is therefore 100% pure tea.

The following example is intended to illustrate the process of the invention. It should not in any way be construed as restrictive of the scope of the invention since other embodiments of the invention will be obvious to those skilled in the art.

EXAMPLE I

About 6% of the dry weight of black tea is pectin and almost all of this remains in the spent tea leaf after hot water extraction of black tea. Spent tea leaves contain about 9% pectic substances on a dry weight basis. Nearly all of these pectic substances can be extracted from spent tea leaves by an alkaline extraction at a pH of 9.5 or higher. On the other hand, about ¼ of the pectic substances is extracted by an acid solution at pH of 2.

Acid hydrolysis of spent tea leaves at elevated temperatures also provides tea pectic substances useful according to the present invention.

Each of the procedures referred to above was used to prepare tea pectic substances in the manner now to be described.

Acid hydrolysate of spent leaf: 75 lbs. of spent tea leaf containing about 70% moisture was combined with 150 lbs. of deionized water containing 420 g. of 36% HCl (pH=2.0) and digested for 30 minutes at 212° F. The acidic suspension was put through a Sharples centrifuge and the filtrate was passed through a 100 mesh screen. The acid extracted spent leaf was discarded.

Another 50 pound portion of spent tea leaf was combined with 100 pounds of deionized water containing 280 g. of 36% HCl (pH=2.1) and digested, filtered, etc., as above.

The acidic filtrates were combined, cooled to 27° C. and titrated to pH 5.0 with 45% KOH. The pH adjusted extract was polished by passing the material through a Westfalia bowl centrifuge. Approximately 200 pounds of a clear solution containing 2.5% solids was obtained and was concentrated to 28 pounds at 14.6% solids. The concentrate was extremely thick, gelatinous and difficult to concentrate. The total weight of solids obtained was 4.1 lbs. which represented about 7.6% of the original black leaf.

Acid gel: 150 lbs. of spent tea leaf containing about 70% water was extracted, filtered, etc., as described above, except that the centrifuged extract at pH 5.0 was not concentrated. An equal volume of 95% ethanol was combined with the centrifuged extract and allowed to stand for about 30 minutes. A gel formed that was separated from the 50% ethanol solution by gently pouring the suspension over a 100 mesh Sweco screen. Thirty-four pounds of gel at 2.9% solids was obtained which represented about 2.7% of the original black leaf.

Alkaline gel: 75 pounds of wet spent tea leaf was combined with 150 pounds of deionized water containing 3.0 pounds of 45% KOH and held at 140° F. for several hours. The suspension was then filtered by using a 100 mesh screen in a Sweco separator. The alkali extract at pH 8.4 was centrifuged at 27–28° C. in a Westfalia centrifuge to remove all leaf fines. An equal volume of 95% ethanol was added to the centrifuged material and a gel formed that was separated as described in the section above. This process was repeated once with another 75 pounds of spent tea leaf. The gels from both extractions were combined for a total of 67.8 pounds at 2.05% solids which represented 3.0% of the original black leaf.

The acid hydrolysate, acid gel and alkaline gel were added at various levels to pure tea extracts prepared as described in U.S. Pat. No. 2,902,368 and the mixture dried in a spray-tower. Prior to using the two gel preparations, they were sparged with live steam for about 1 hour to remove the ethanol.

The results given in Table 1 below show clearly that the addition of pectins to concentrated unfilled extracts of black tea to the extent of 1% or less of the solids contained in the extract, results in a preparation which can be easily spray-dried to a powder with satisfactory bulk density, i.e., a tapped bulk density of 0.090 g./ml. The bulk density can easily be controlled by using different amounts or types of pectic substances, in conjunction with adjusting one or more of the spray-drying conditions.

TABLE 1

[Addition of pectic substances from spent leaf to unfilled spray-tower feed]

| Run No. | Percent of tea solids added as pectin-containing material | Solubility at 13.5° C. distilled water | Tapped bulk density, g./ml. |
|---|---|---|---|
| 1 | Control-unfilled concentrate | Clear, good | 0.109 |
| 2 | 1% KOH gel pectic substances | do | 0.063 |
| 3 | 0.5+ KOH gel pectic substances | do | 0.078 |
| 4 | 1% acid gel pectic substances | do | 0.047 |
| 5 | 4% acid hydrolysate | do | 0.095 |

The process of this invention has made it possible to control the bulk density of instant tea powders without the addition of foreign filler materials. It is possible to achieve lower bulk densities through the use of the present process than were possible under processes using foreign filler materials. As an added advantage instant teas prepared according to this process contain 100% pure tea unadulterated by materials from non-tea sources.

We claim:

1. A process for making a spray-dried instant tea of desired bulk density, comprising the steps of preparing a hot-water extract of tea leaf, subjecting the spent tea leaf, after separation of the tea extract therefrom, to conditions which solubilize the tea pectic substances therein, recovering the tea pectic substances, forming an aqueous solution of tea pectic substances, adding the aqueous solution of tea pectic substances to the tea extract in an amount within the range of about 0.2% to 2% tea pectic substances based upon the weight of tea solids in the tea extract, and spray-drying the aqueous mixture of tea extract and tea pectic substances to produce an instant tea powder having a bulk density of approximately 0.045 gram per milliliter to 0.100 gram per milliliter.

2. The process of claim 1, wherein the tea pectic substances are extracted from spent tea leaf by first subjecting the spent tea leaf in the presence of water to potassium hydroxide at a pH of about 8.4 and a temperature of about 140° F., separating the extract from the insoluble tea leaf solids, followed by precipitating the tea pectic substances from the extract with ethanol.

3. An instant tea powder comprising a spray dried mixture of a hot water tea leaf extract and an additional amount of tea pectic substances in aqueous solution, the tea pectic substances being present in the range of about 0.2% to 2% based on the weight of tea solids in the tea extract; the powder having a bulk density of approximately 0.045 gram per milliliter to 0.100 gram per milliliter.

References Cited

UNITED STATES PATENTS

| 2,971,844 | 2/1961 | Bosanac | 99—77 X |
| 2,476,072 | 7/1949 | Tressler | 99—77 |
| 2,852,388 | 9/1958 | Cortez | 99—77 |
| 3,163,539 | 12/1964 | Barch | 99—76 X |
| 3,424,589 | 1/1969 | Kan et al. | 99—199 X |
| 3,477,854 | 11/1969 | Vuataz et al. | 99—76 X |
| 2,831,772 | 4/1958 | Herz | 99—77 |
| 2,140,788 | 12/1938 | Cowgill | 99—199 |

OTHER REFERENCES

The Pectic Substances, by Z. Kertesz, Interscience Publishers, New York.

FRANK W. LUTTER, Primary Examiner

S. L. WEINSTEIN, Assistant Examiner